Aug. 11, 1970
C. L. MURPHY
3,523,581
OIL RECOVERY PROCESS USING VISCOSIFIER AND
SHEAR-THICKENING LIQUID
Filed June 21, 1968
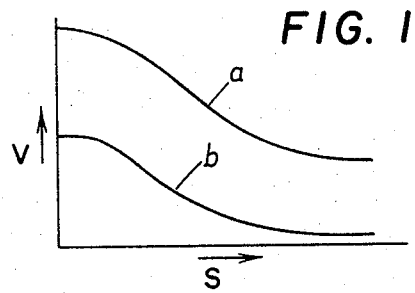
FIG. 1
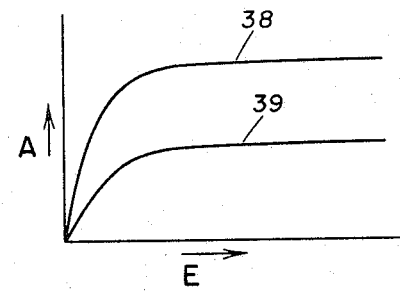
FIG. 4
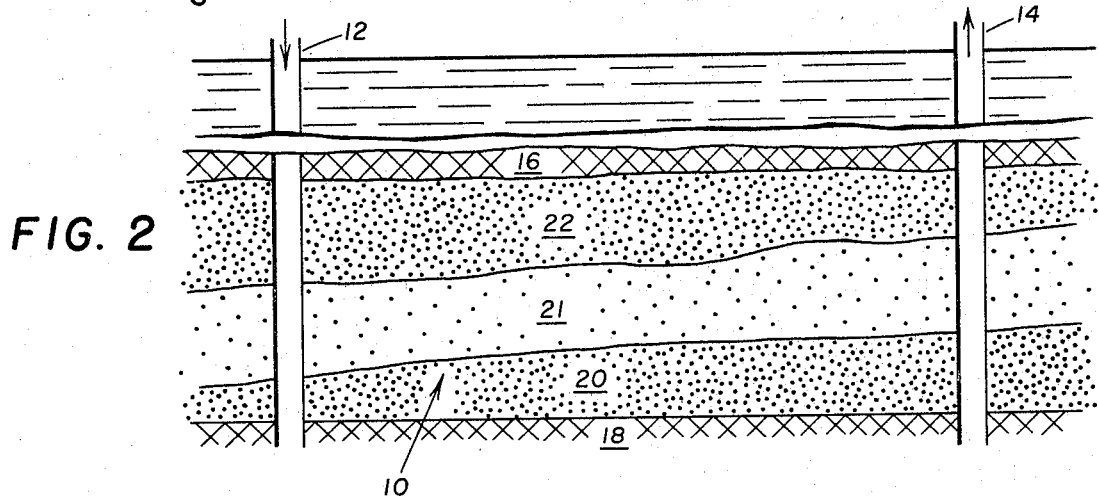
FIG. 2
FIG. 3a
FIG. 3b
FIG. 3c
CHARLES L. MURPHY
INVENTOR
BY *William R. Jackson*
ATTORNEY United States Patent Office 3,523,581
Patented Aug. 11, 1970

3,523,581
OIL RECOVERY PROCESS USING VISCOSIFIER AND SHEAR-THICKENING LIQUID
Charles L. Murphy, Dallas, Tex., assignor to Mobil Oil Corporation, a corporation of New York
Filed June 21, 1968, Ser. No. 739,107
Int. Cl. E21b *43/22*
U.S. Cl. 166—273
5 Claims

ABSTRACT OF THE DISCLOSURE

This specification discloses a secondary oil recovery process. In practicing the invention a first aqueous liquid which contains an adsorbing viscosifier is injected into the reservoir. The viscosifier may exhibit either Newtonian or shear-thinning properties. Subsequent to the injection of the first liquid, a second aqueous liquid which is shear-thickening and which contains a sacrificial agent which preferentially adsorbs on the reservoir rock surfaces with regard to the viscosifier is injected into the reservoir. A driving fluid then may be injected in order to move the liquids through the reservoir and displace oil therefrom.

BACKGROUND OF THE INVENTION

This invention relates to the recovery of oil from subterranean oil reservoirs and, more particularly, to new and improved secondary recovery operations utilizing shear-thinning and shear-thickening liquids.

In the recovery of oil from oil-bearing reservoirs it usually is possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In these supplemental techniques, which commonly are referred to as secondary recovery operations, although in fact they may be primary or tertiary in sequence of employment, fluid is introduced into the reservoir in order to displace the oil therein to a suitable production system through which the oil may be withdrawn to the surface of the earth. The displacing medium may be a gas, an aqueous liquid such as fresh water or brine, an oil-miscible liquid such as butane, or a water and oil-miscible liquid such as an alcohol. Generally, the most promising of the secondary recovery techniques involves the injection into the reservoir of an aqueous flooding medium, either alone or in combination with other fluids.

One difficulty which is often encountered in secondary recovery operations is the relatively poor volume sweep efficiency of the injected displacing liquid; that is, the tendency of the displacing liquid to channel through certain portions of the reservoir and to bypass other portions. Such poor volume sweep efficiency is occasioned by differences between the mobility of the injected displacing medium and the in-situ reservoir oil and also by permeability variations within the reservoir. The reservoir may comprise a plurality of fairly well defined zones of widely diverse permeabilities. The injected displacing fluid preferentially flows through the more permeable zones of the reservoir thus leading to premature breakthrough of the displacing fluid at the production well or wells.

Various techniques have been proposed in order to improve the volume sweep efficiency of the injected displacing fluid and thus avoid premature breakthrough. For example, it has been proposed to selectively inject plugging agents into the more permeable zones of the reservoir in order to effect an overall decrease in permeability variation. Another technique for increasing volume sweep efficiency involves the utilization of a relatively viscous displacing liquid. Thus, in waterflooding operations, for example, thickening agents have been added to at least a portion of the flood water in order to increase the viscosity thereof. The viscosity of the displacing liquid may be increased prior to its injection into the reservoir. Alternatively, the viscosity of the liquid displacing medium may be increased in-situ, in order to avoid a reduction in injectivity at the injection wells. For example, in U.S. Pat. No. 3,208,518 to John T. Patton, there is disclosed a waterflooding process in which the viscosity of the aqueous displacing medium is increased in-situ through the use of high molecular weight ionic polymers under controlled pH conditions. Another technique whereby the viscosity of the aqueous displacing medium may be increased in-situ involves the injection of a shear-thinning liquid. For example, as disclosed in U.S. Pat. No. 3,292,-696 to B. B. Sandiford, an aqueous solution of hydroxyethyl cellulose which exhibits a relatively low viscosity at high shear rates may be injected in order to displace oil from the formation. Also, as disclosed in U.S. Pat. No. 3,315,743 to M. K. Abdo et al., it has been proposed to inject an aqueous shear-thickening liquid in a waterflooding procedure.

SUMMARY OF THE INVENTION

In accordance with the present invention, there is provided a new and improved technique for the secondary recovery of oil. The invention is practiced in a subterranean reservoir which is penetrated by spaced injection and production systems defining a recovery zone of the reservoir. In carrying out the invention a first aqueous liquid containing an adsorbing viscosifier which may be Newtonian or shear-thinning is injected into the reservoir via the injection system in order to displace oil within the recovery zone in the direction of the recovery system. Thereafter, a second aqueous shear-thickeneing liquid is injected into the reservoir through the injection system. The second aqueous liquid contains a sacrificial agent which preferentially adsorbs on the reservoir rock surfaces with respect to the viscosifier. As the first and second liquids move through the reservoir, they become mixed with the greatest relative mixing occurring in zones of relatively low permeability. As mixing occurs, the darcy viscosity of the mixed displacing liquid is decreased with the result that flow stratification within the reservoir is reduced. Concomitantly with the injection of the various liquids in accordance with the invention, oil is recovered from the production system as in conventional waterflooding operations.

In a preferred embodiment of the invention, the adsorbing viscosifier is a shear-thinning agent. Thus, the first injected aqueous liquid is a shear-thinning fluid while the second injected aqueous liquid is a shear-thickening fluid. In a further preferred embodiment of the invention the second aqueous liquid is followed by an aqueous stripping liquid in which the sacrificial agent exhibits a lower saturation adsorption value than in the second aqueous liquid. By this technique the sacrificial agent is effectively moved through the reservoir as a bank in order to enhance mixing within the lower permeability zones.

BRIEF DESCRIPTION OF THE DRAWINGS

FIG. 1 is an illustration showing the effect of adsorption on the darcy viscosity of a shear-thinning solution;

FIG. 2 is a vertical section of an oil reservoir, taken between injection and production wells, showing exemplary permeability variations within the reservoir;

FIGS. 3a, 3b, and 3c are diagrammatic illustrations showing the progressive flow of injected fluids through adjacent reservoir zones of similar permeabilities; and FIG. 4 is an illustration showing adsorption isotherms of a sacrificial agent in the second injected aqueous liquid and the stripping liquid.

DESCRIPTION OF SPECIFIC EMBODIMENTS

The present invention is carried out in a recovery zone of a subterranean oil-bearing reservoir. As will be understood by those skilled in the art, by the term "recovery zone," as used herein and in the appended claims, is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" pattern may be utilized, in which case the injection and production systems comprise rows of wells spaced from one another. In this type of pattern the recovery zone, as defined by the spaced rows of injection and production wells, generally will be that portion of the reservoir underlying the area between these spaced rows. Exemplary of other patterns which may be used is the so-called "circular flood" pattern in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these wells which is subject to the displacing action of the injected flooding medium. The above and other patterns are well known to those skilled in the art and for a more detailed description of such patterns reference is made to L. C. Uren, Petroleum Production Engineering—Oil Field Exploitation, 2nd ed., McGraw-Hill Book Company, Inc., New York and London, 1939, and more particularly to the section entitled "The Water Flooding Process," appearing at pp. 444–459.

The phenomenon of adsorption whereby a solute, either in true solution or in a colloidal dispersion, in a carrier liquid, is deposited on solid surfaces contacted by the carrier liquid is well known to those skilled in the art. This phenomenon is manifested in secondary recovery operations such as waterflooding in which solutes dissolved or dispersed in the injected water tend to be adsorbed from the water onto the rock surfaces within the reservoir. In fact, this tendency is so pronounced that it has proven to be a major obstacle in successfully accomplishing such operations as the so-called polymer flood in which organic polymers which act as viscosifiers are dissolved or dispersed in an aqueous flooding medium. Oftentimes the rate of adsorption is so high that it is economically impractical to maintain the polymeric materials in adequate concentrations in the flood water.

The amount of a solute adsorbed from a carrier liquid onto a given surface area of reservoir rock depends, within limits, upon the concentration of the solute in the liquid. The higher the concentration, the greater the amount of solute that will be adsorbed. When a solution or dispersion is placed in contact with an adsorbing reservoir rock the amount of solute adsorbed will gradually increase and the concentration of the solute in the carrier liquid will decrease until an equilibrium concentration is established at which the rates of desorption and adsorption are equal. If the concentration of solute in the carrier liquid is then increased, the amount of adsorbate will increase to a new equilibrium value and, conversely, if the concentration is decreased, the adsorbent reservoir rock will lose adsorbed solute to the surrounding liquid until equilibrium is once again established. This relationship will exist for a given adsorbent-solute-liquid system until such time as substantially all adsorption sites on the adsorbent are satisfied. Thereafter, an increase of solute in solution will result in little or no additional solute being adsorbed on the adsorbent. At this point, the system has reached a state of saturation-adsorption. The maximum amount of solute which can be adsorbed from a given carrier liquid per unit volume or weight of adsorbent is termed the "saturation-adsorption value" of the solute for the particular carrier liquid and is a measure of the capacity of this solute to be adsorbed from the liquid.

While adsorption thus prevents great difficulties in polymer flooding operations, it also enhances the efficacy of such operations by increasing the apparent or "darcy" viscosity o fthe flooding medium as it flows through the reservoir. This phenomenon is illustrated in FIG. 1 which is a plot of shear rate S on the abscissa versus the darcy viscosity V on the ordinate for an aqueous solution of a shear-thinning agent with and without adsorption. More particularly, curve $a$ in FIG. 1 illustrates the darcy viscosity of the fluid when adsorption of the shear-thinning agent occurs and curve $b$ illustrates the darcy viscosity of this same solution but without such adsorption. As illustrated in FIG. 1, at a given shear rate the darcy viscosity of the fluid medium as it flows through the formation is relatively high when adsorption occurs. However, when adsorption is eliminated or drastically reduced as through the addition of a preferentially adsorbing sacrificial agent to the fluid medium, the darcy viscosity is lowered appreciably at this same shear rate. This of course results in a corresponding increase in the mobility of the flooding medium within the reservoir.

While the invention is not to be limited by any particular theory, it is thought likely that the observed increase in darcy viscosity as illustrated by curve $a$ of FIG. 1 is a physical phenomenon due to a deposition of the shear-thinning agent within the reservoir. More particularly, as the flooding medium moves through the reservoir with adsorption occurring, the shear-thinning agent is deposited on the rock surfaces forming the interstitial flow passages. This reduces the cross-sectional area for a particular passage available for flow of the flooding medium and results in the observed increase in the darcy viscosity of the flooding medium. By adding a sacrificial agent to the flooding medium the amount of shear-thinning agent deposited through adsorption is greatly reduced, thus causing a decrease in darcy viscosity as illustrated by curve $b$.

Turning now to FIG. 2, there is illustrated an oil reservoir 10 penetrated by spaced injection and production wells 12 and 14, respectively. While, for the purpose of simplicity in describing the invention, only one injection well and one production well are shown, it will be recognized that in practical applications of the invention a plurality of such wells may be, and in most cases will be, utilized. Thus, the wells 12 and 14 may each be considered to be located in rows of spaced injection and production wells, as in the line flood pattern described above. Also, the injection well 12 may be considered to be the central well in a circular flood pattern, e.g., a five-spot or nine-spot pattern, and the production well 14 one of the peripheral wells.

The reservoir 10 is bounded by layers 16 and 18 of relatively impermeable rock which overlie and underlie the reservoir. The reservoir is shown as being comprised of a number of fairly well defined zones 20, 21, and 22 which differ in permeability from one another in the direction of flow from the injection well to the production well. These zones may, of course, slope or have various curvatures, but typically they extend generally parallel to one another as shown. Some of the zones may be discontinuous; that is, they may terminate or begin at various locations as viewed in the direction of flow. In addition, the several zones may be in fluid communication with one another such that cross-flow between adjacent zones occurs throughout their extent or they may be separated by strata such as shale layers of very little or no permeability such that little or no cross-flow occurs between adjacent zones. As a practical matter, the permeability stratification of a typical oil reservoir will fall between these two extremes such that some cross-flow will occur between adjacent zones. Also, while only vertical permeability variation is shown in the reservoir 10, it will be recognized that the reservoir may exhibit horizontal permeability variation. That is, a horizontal section through the reservoir may reveal zones of diverse permeabilities.

Of the reservoir zones illustrated, those indicated by reference numerals 20 and 22 are considered to be zones of relatively low permeability with the zone 21 being a zone of relatively high permeability. Each of the reservoir zones 20, 21, and 22 contains oil which is desired to be displaced to the production well 14 by injecting a suitable fluid through the injection well 12. It will readily be recognized that upon injecting a displacing fluid through the well 12, the fluid will flow preferentially through the zone 21 of high permeability with the result that relatively rapid displacement occurs therein as compared with the low permeability zones 20 and 22. Thus, the high permeability zone 21 will be "swept out" and the displacing fluid will break through at the production well 14 long before the injected displacing fluid is moved completely through the low permeability zones 20 and 22.

The invention will first be described in detail with respect to the preferred embodiment which entails the sequential injection of shear-thinning and shear-thickening liquids. In this embodiment, an aqueous liquid containing a viscosifier which imparts shear-thinning properties thereto is first injected through the injection well 12 and into reservoir 10 in order to displace oil therein in the direction of the production well. As will be understood by those skilled in the art, by the term "shear-thinning" is meant that characteristic whereby a liquid exhibits a decrease in viscosity with an increase in shear rate. The property of shear-thinning thus enables a liquid to develop a relatively low viscosity when subjected to a high rate of shear in a subterranean formation. Such a high shear rate is induced, for example, when the liquid flows from the injection well into the reservoir. Due to the radial flow geometry attendant to the movement of the liquid between the formation and the well, the flow velocity and shear rate are much higher immediately adjacent the well than at more remote locations deeper into the formation. Thus, the effect of shear-thinning on viscosity during flow through a formation is confined to a relatively small area immediately adjacent the injection well and beyond this area its effect is negligible.

By injecting a shear-thinning liquid, the preferential flow of the displacing liquid through the more permeable zone, commonly termed "flow stratification," is seriously aggravated. However, at the same time the injectivity of the displacing liquid into the formation is greatly enhanced over that which would be obtained with a Newtonian fluid exhibiting the same viscosity as the shear-thinning liquid at a near-zero shear rate. This increase in injectivity results in much faster oil recovery than would be obtained through the use of a Newtonian liquid of comparable viscosity. In addition, this initial increase in flow stratification is utilized to advantage in the present invention to ultimately effect an improvement in volumetric sweep efficiency.

After injection of the shear-thinning liquid, an aqueous liquid containing a shear-thickening agent, and in addition a sacrificial agent which absorbs perferentially with respect to the previously injected shear-thinning agent, is injected through the injection system and into the reservoir. By the term "shear-thickening" is meant that characteristic whereby a liquid exhibits an increase in viscosity with increasing shear rate. Similarly as described above with regard to the phenomenon of shear-thinning, the effect of shear-thickening on the viscosity of a liquid as it flows through a formation is limited to a relatively small area immediately adjacent the injection well. Thus, the property of shear-thickening tends to decrease the injectivity of the liquid as it is introduced from the well into the adjacent formation. In addition, the injection of a shear-thickening liquid tends to reduce flow stratification in zones of diverse permeabilities.

As will be described in greater detail hereinafter, the first and second injected aqueous liquids will ultimately mix as they move through the reservoir with the attendant result that as the presence of the sacrificial agent reduces the adsorption of the shear-thinning agent, the darcy viscosity of liquid containing the shear-thinning agent is decreased. More relative mixing occurs in low permeability zones 20 and 22 than in high permeability zone 21. Thus, the tendency toward flow stratification is alleviated, resulting in an improved volumetric sweep efficiency.

Turning now to FIGS. 3a, 3b, and 3c, there is shown an idealized reservoir model illustrating the sequential locations and flow paths of the various liquids injected in accordance with the present invention. Fluid movement through the model is shown as being from left to right. The reservoir model is depicted as having a high permeability zone 24 and a low permeability zone 26. By way of example, the zones 24 and 26 may be considered as corresponding generally to the zones 21 and 20, respectively, shown in FIG. 2.

In the situation depicted by FIG. 3a, the first aqueous liquid containing a shear-thinning agent has been injected into the reservoir to form liquid banks 28 and 28a. Since, as noted previously, shear-thinning increases flow stratification, the ratio of the size of bank 28 to the size of bank 28a is greater than the ratio of the permeability of zone 24 to the permeability of zone 26. Thus, at the end of the first injection step the first aqueous liquid will be distributed as shown with a greater portion thereof contained in the high permeability zone 24 than would be the case with a Newtonian fluid.

After injection of the first aqueous liquid, the second aqueous liquid containing a shear-thickening agent and a sacrificial agent is injected, resulting in the distribution shown in FIG. 3b. In FIG. 3b, the second aqueous liquid is identified in zone 24 by reference numeral 30 and in zone 26 by reference numeral 30a. Since injection of the second aqueous liquid, by virtue of its shear-thickening properties, tends to decrease flow stratification, the ratio of the size of bank 30 to the size of bank 30a is less than the ratio of the permeability zones 24 and 26. Stated otherwise, for the sequential injection of shear-thinning and shear-thickening liquids, the ratio $R_b$ as defined by Equation 1 below is greater than one.

$$R_b = \frac{\frac{L_1}{L_{1a}}}{\frac{L_2}{L_{2a}}} \qquad (1)$$

wherein:

$L_1$ is the size of the bank of first injected liquid in the more permeable zone (bank 28);

$L_{1a}$ is the size of the bank of first injected liquid in the less permeable zone (bank 28a);

$L_2$ is the size of the bank of second injected liquid in the more permeable zone (bank 30);

$L_{2a}$ is the size of the bank of second injected liquid in the less permeable zone (bank 30a).

If the first and second liquids were Newtonian, the high and low permeability zones would take both liquids in proportion to their permeabilities and the ratio $R_b$ ideally would be one.

Subsequent to the injection of the shear-thinning and shear-thickening liquids, a suitable driving fluid is injected in order to move banks 28, 28a, 30, and 30a through the reservoir. As the liquid banks are transported through the reservoir the concentration of agents contained in the liquids will tend to be elongated and attenuated by adsorption and dispersion. In addition, the radial flow geometry existing in the reservoir will tend to narrow the several banks of liquid as they are moved outwardly into the reservoir from the point of injection.

With progressive movement of the injected liquids through the reservoir the shear-thickening liquid containing the sacrificial agent will tend to become mixed with the first injected aqueous liquid containing the shear-thinning agent. The presence of the sacrificial agent will then, as explained previously, reduce adsorption of the shear-thinning agent, resulting in a decrease in the darcy viscosity of the mixed portion of the slugs. This situation is depicted in FIG. 3c in which reference characters 32 and 32a indicate the driving fluid injected subsequent to the shear-thickening fluid and shaded portions 34 and 34a indicate liquid slugs of relatively low darcy viscosity formed through mixing of banks 38 and 30 and 28a and 30a.

As can be seen from an examination of FIG. 3c, the greatest relative amount of mixing will occur in the low permeability zone 26. More specifically, at a given time subsequent to initiation of the process, the banks 28a and 30a in the low permeability zone 26 will become completely mixed, whereas banks 28 and 30 in the high permeability zone 24 will be only partially mixed resulting in the front portion of the initially formed bank 28 retaining its relatively high darcy viscosity. As a result, the resistance to flow in high permeability zone 24 will remain relatively high while the resistance to flow in low permeability zone 26 will be decreased appreciably. This situation will remain until such time as complete mixing of the liquid banks 28 and 30 in zone 24 may occur. If desired, the above sequence of operation may be repeated one or more times by again injecting a shear-thinning liquid and following it by a shear-thinning liquid containing a sacrificial agent.

The driving fluid injected subsequent to the shear-thickening liquid which contains the sacrificial agent, may be any suitable displacing medium. Thus, the driving fluid may be unthickened water, thickened water exhibiting Newtonian characteristics, or thickened water exhibiting non-Newtonian characteristics, i.e., a shear-thinning or shear-thickening liquid. It usually will be preferred in carrying out the invention to utilize a Newtonian fluid which may be either thickened or unthickened water.

Regardless of the rheology of the subsequently injected driving fluid, it is preferred in carrying out the invention to utilize as the driving fluid an aqueous medium in which the sacrificial agent exhibits a saturation-adsorption value which is substantially less than the saturation-adsorption value exhibited by the sacrificial agent in the second injected aqueous liquid. Thus, as the driving fluid moves through the reservoir, desorption of the sacrificial agent from the rock surfaces is effected thus helping to maintain the bank of sacrificial agent available for mixing with the first injected shear-thinning liquid.

Typical adsorption characteristics of the sacrificial agent in the second injected aqueous liquid and the driving liquid are illustrated graphically in FIG. 4 which shows adsorption isotherms of the sacrificial agent in the second injected aqueous liquid and the subsequently injected driving liquid. In FIG. 4, the equilibrium concentration E in weight of solute per volume of aqueous liquid is plotted on the abscissa and the adsorption A in weight of sacrificial agent adsorbed per volume of reservoir rock is plotted on the ordinate. Curve 38 is the adsorption isotherm of the sacrificial agent in the second injected aqueous shear-thickening liquid and curve 39 is the adsorption isotherm for the sacrificial agent in the aqueous driving fluid. The driving fluid which acts as a stripping agent with regard to the adsorbed sacrificial agent will at equilibrium conditions desorb a mass of sacrificial agent equal to the difference between the adsorption maxima for each unit volume of saturated reservoir rock traversed. Thus, as the driving fluid moves through the reservoir rock the concentration of sacrificial agent therein will build continuously by desorption so as to maintain sacrificial agent available for mixing with the shear-thinning liquid.

The adsorption characteristics of the second aqueous liquid and the driving liquid may be controlled through suitable adjustment of salinity and/or pH. In this regard, a reduction in adsorption rate and hence an increase in the stripping or desorption characteristic of a liquid can be accomplished by a reduction in salinity and/or an increase in pH. While the adsorption rate can be controlled by pH alone, it is controlled more effectively by salinity and this is preferred in carrying out the invention. Thus, the second aqueous liquid containing the sacrificial agent preferably has a salinity greater than that of the aqueous driving liquid. By way of example, the second aqueous liquid may exhibit a salinity of about 1.0–5.0 percent and the driving liquid may be relatively fresh water having a salinity of about 0.2–1.0 percent. Where the reservoir contains appreciable amounts of hydratable clays it may be desirable to employ relatively low salinity water in only the first portion of the driving liquid with the remainder thereof having a greater salinity.

By the term "salinity" is meant the dissolved salts content of the aqueous liquid expressed in weight percent. As a practical matter, the salinity of the driving liquid and the second liquid will usually be controlled by sodium chloride since this salt is inexpensive and usually will be available locally. However, salinity control can be effected by other salts, particularly the other alkali metal halides such as potassium chloride. While divalent metal salts such as calcium or magnesium chloride may sometimes be used, caution should be exercised in this regard since such salts oftentimes will be incompatible with materials in the reservoir or in the injected liquids.

While it is preferred that both the first and second injected liquids be non-Newtonian with the first being shear-thinning and the second shear-thickening, the invention can be practiced to advantage utilizing a Newtonian adsorbing viscosifier in the first injected liquid. The liquid should still be a shear-thickening fluid. In this case, the ratio $R_b$, as defined by Equation 1, will be greater than one although somewhat less than the ratio $R_b$ obtained by utilizing both shear-thinning and shear-thickening liquids as in the preferred embodiment. Thus, as the first and second liquid banks move through the reservoir the greatest relative mixing thereof will occur in zones of relatively low permeability. This will result, similarly as explained above with respect to the preferred embodiment of the invention, in the sacrificial agent in the second liquid reducing the adsorption rate of the Newtonian viscosifying agent present in the first liquid. Thus, the darcy viscosity of the mixed displacing liquid in the low permeablity zones will be reduced.

The aqueous liquids utilized in the present invention may be formed by treating water as is used in conventional waterflooding operations with appropriate additives.

The preferred viscosifiers for use in the first aqueous liquid are the partially hydrolyzed polyacrylamides, which are shear-thinning agents. These polymers typically exhibit molecular weight of one million or more and exhibit a percent hydrolysis within the range of 2 to 67 percent. For a more detailed description of such partially hydrolyzed polyacrylamides, references is made to U.S. Pat. No. 2,827,964 to B. B. Sandiford et al. and U.S. Pat. No. 3,039,529 to K. R. McKennon. Partially hydrolyzed polyacrylamides suitable for use in the invention are commercially available from the Dow Chemican Company, Midland, Mich., and are identified as the PUSHER Series chemicals. Other viscosifiers, either Newtonian or shear-thinning, which exhibit an increase in darcy viscosity due to adsorption thereof onto the reservoir rock surfaces may be utilized in the present invention. The tendency of a given viscosifier to adsorb on a particular reservoir rock and also the effect of such adsorption on the darcy viscosity of an aqueous solution of the viscosifier can be determined through laboratory tests carried out on cores taken from the formation of interest.

Suitable shear-thickening additives include alkali metal salts of the long-chained aliphatic acids such as sodium oleate, sodium palmitate, and sodium stearate; polyvinyl alcohol-sodium borate complexes, sodium bis-(2-ethylhexyl) sulfosuccinate or other dialkyl sulfosuccinates of the type disclosed in U.S. Pat. No. 3,302,712 to H. L. Townsend et al.; and copper cetyl tolyl ether sulfonates such as disclosed in the aforementioned Pat. No. 3,315,743 to Abdo et al. It will be recognized that the above-described additives are exemplary only and that any agents may be utilized which impart the desired properties to water, and which are not harmful to the formation or oil therein or otherwise incompatible with the practice of the invention.

The various additives such as noted above may be added to the aqueous liquids in any concentration necessary to produce the desired viscosity. It usually will be desirable to provide a mobility ratio of no greater than one with respect to the reservoir oil for both the shear-thinning and shear-thickening liquids at near-zero shear rates. This mobility ratio M is expressed by the relationship:

$$M = \frac{K_w \times \mu_o}{K_o \times \mu_w}$$

wherein:

$K_o$ is the relative permeability to oil,
$K_w$ is the relative permeability to water,
$\mu_o$ is the viscosity of the oil, and
$\mu_w$ is the viscosity of the floodwater.

The value of $\mu_w$ needed to effect a mobility ratio of one or less typically will be within the range of about 2 to 20 centipoises but in some cases may range as high as 40 to 50 centipoises.

The concentrations of the various additives noted above necessary to produce this desired mobility ratio when the shear rate of the aqueous liquid is at or near zero typically will be within the range of about .01 to .05 percent by weight, although higher or lower concentrations may be necessary depending upon the particular additive involved and the degree of viscosity enhancement necessary. The concentrations in which an additive should be employed and its efficacy as a shear-thinning or shear-thickening agent can readily be determined through well known laboratory tests utilizing standard instruments such as a variable rotational viscosimeter.

The sacrificial agents employed in the invention may be any molecular species which preferentially adsorbs on the reservoir rock surface with respect to the shear-thinning or Newtonian viscosifying agent employed in the first aqueous liquid. Suitable sacrificial agents include the alkali metal and ammonium carbonates, with sodium carbonate being the most desirable from the standpoint of availability and economy. Further sacrificial agents which may be employed include the alkali metal polyphosphates such as sodium tripolyphosphate, sodium tetraphosphate, tetrasodium polyphosphate, sodium pyrophosphate, sodium acid pyrophosphate, and sodium metaphosphate. Other suitable sacrificial agents include ethylenediaminetetraacetic acid and sodium borate decahydrate.

Of the various sacrificial agents listed above, sodium tripolyphosphate and sodium carbonate will usually be preferred from the standpoint of availability and widespread compatability with the various reservoir rocks and the viscosity modifiers involved. In most reservoirs, particularly those of low clays content, sodium carbonate will be the most effective sacrificial agent. Sodium tripolyphosphate is particularly effective in reservoirs exhibiting high clays content, particularly those of the montmorillonite group. Mixtures of sodium tripolyphosphate and sodium carbonate are also effective in reservoirs containing montmorillonite clays.

It is to be recognized that various sacrificial agents in addition to those disclosed herein may be utilized in the practice of the present invention. The efficacy of a material as a sacrificial agent in relation to specific reservoir rocks and viscosifiers may be determined through laboratory tests carried out with regard to the reservoir rock and viscosifier in question. For example, static adsorption tests in which a sample of reservoir rock is ground-up and then contacted with various aqueous solutions of a proposed sacrificial agent and viscosifier may be carried out in order to obtain adsorption isotherms such as those illustrated in FIG. 4.

Having described specific embodiments of the instant invention, it will be understood that further modifications thereof may be suggested to those skilled in the art, and it is intended to cover all such modifications as fall within the scope of the appended claims.

What is claimed is:

1. In the recovery of oil from a subterranean oil reservoir penetrated by spaced injection and production systems defining a recovery zone of said reservoir, the method comprising:

injecting into said reservoir via said injection system a first aqueous liquid containing an adsorbing viscosifier selected from the class consisting of shear-thinning and Newtonian agents;

injecting into said reservoir via said injection system a second aqueous liquid which is shear thickening and contains a sacrificial agent which preferentially adsorbs on the surfaces of said reservoir with respect to said viscosifier; and recovering oil from said production system.

2. The method of claim 1 further comprising, subsequent to the injection of said second aqueous liquid, injecting into said reservoir via said injection system an aqueous driving liquid in which said sacrificial agent exhibits a lower saturation adsorption value than in said second aqueous liquid.

3. The method of claim 1 wherein said viscosifier is a shear-thinning agent.

4. The method of claim 3 wherein said shear-thinning agent is a partially hydrolyzed polyacrylamide.

5. The method of claim 3 further comprising, subsequent to the injection of said second aqueous liquid, injecting into said reservoir via said injection system an aqueous driving liquid in which said sacrificial agent exhibits a lower saturation adsorption value than in said second aqueous liquid.

References Cited

UNITED STATES PATENTS

| | | | |
|---|---|---|---|
| 3,370,649 | 2/1968 | Wolgemuth | 166—274 |
| 3,372,748 | 3/1968 | Cook | 166—273 X |
| 3,421,582 | 1/1969 | Fallgatter | 166—273 |

OTHER REFERENCES

Zimmerman, O. T., et al. Handbook of Material Trade Names, Supp. IV. Dover, N. H., Ind. Research Serv., 1965, p. 72.

ERNEST R. PURSER, Primary Examiner

I. A. CALVERT, Assistant Examiner